United States Patent [19]

Ketteler

[11] Patent Number: 5,749,669
[45] Date of Patent: May 12, 1998

[54] DEVICE FOR THE MUTUAL ALIGNMENT AND ATTACHMENT OF TWO COMPONENTS

[75] Inventor: Alfons Ketteler, Darmstadt, Germany

[73] Assignee: Robert Bosch GmbH, Stuttgart, Germany

[21] Appl. No.: 766,305

[22] Filed: Dec. 13, 1996

[30] Foreign Application Priority Data

Feb. 2, 1996 [DE] Germany .................. 196 03 751.4

[51] Int. Cl.$^6$ .................................................. F16B 39/00
[52] U.S. Cl. ...................... 403/12; 403/389; 403/405.1; 52/506.05; 52/508
[58] Field of Search ................. 403/12, 13, 289, 403/326, 329, 389, 260, 288, 405.1, 407.1; 411/508, 509, 913; 52/506.01, 506.05, 506.06, 506.08, 508, 703, 747.1

[56] References Cited

U.S. PATENT DOCUMENTS

| | | | |
|---|---|---|---|
| 3,486,158 | 12/1969 | Soltysik et al. | 411/913 X |
| 4,721,248 | 1/1988 | Chow | 403/289 X |
| 4,906,152 | 3/1990 | Kurihara | 411/508 X |
| 4,981,405 | 1/1991 | Kato | 411/508 X |
| 5,028,190 | 7/1991 | Loughlin, Jr. et al. | |
| 5,193,961 | 3/1993 | Hoyle et al. | 411/508 X |
| 5,250,058 | 10/1993 | Miller et al. | 411/509 X |
| 5,618,129 | 4/1997 | Skarivoda | 403/389 |

FOREIGN PATENT DOCUMENTS

| | | | |
|---|---|---|---|
| 374032 | 6/1990 | European Pat. Off. | 403/13 |
| 4313739 | 11/1994 | Germany . | |
| 997710 | 7/1965 | United Kingdom | 411/508 |
| 2077846 | 12/1981 | United Kingdom | 403/13 |

Primary Examiner—Harry C. Kim
Attorney, Agent, or Firm—Felfe & Lynch

[57] ABSTRACT

Two components are connected to each other by least one screw and held a certain distance apart from each other by a spacer which is provided with a slot for the passage of the screw. A first component has a hole which is larger than the shaft of the screw, this hole being covered by a washer borne against by the head of the screw. Slots provided in the washer and in the spacer permit not only a two-dimensional change of position of the first component with respect to the shaft of the screw but also a two-dimensional change of position of the washer and the spacer with respect to the shaft of the screw. When the components are being aligned, the washer and the spacer can be rotated by means of fingers extending from the spacer and through holes in the washer in such a way that the washer and the spacer continue to be concentric to the central axis of the hole in the first component. When the screw is tightened, optimum transmission of force is achieved from the washer to the first component and from the first component to the spacer.

7 Claims, 2 Drawing Sheets

DEVICE FOR THE MUTUAL ALIGNMENT AND ATTACHMENT OF TWO COMPONENTS

BACKGROUND OF THE INVENTION

The invention relates to a device for the mutual alignment and attachment of two components in spaced relationship, the device comprising a spacer received between the components, a washer received against one of the components opposite from the spacer, and a screw for attaching the device and the first component to the second component.

To attach two components together or to attach one component to a wall, it is generally known that holes can be provided in the first component, which serve to guide screws, whereas the second component is provided with threaded bores to accept the shafts of the screws at the points corresponding to the holes. It is also known that washers can be installed between the head of the screw and the component to be attached. If the side of the second component facing the first component is uneven, it is also known that spacers can be inserted between the first component and the second component; these spacers hold the first component a defined distance away from the second component. If the first component is to be attached to an uneven wall by a rear surface consisting of sheet metal, the use of spacers prevents the sheet metal wall from becoming undesirably deformed. Alternative solutions, which consist in deep-drawing the sheet metal wall to form raised surfaces to serve as spacer elements, are usually expensive and technically complicated. As a rule, a spacer consists of a cylindrical base element, which is provided with an opening for the passage of the screw. These bases are simply slipped over the shafts of the screws and clamped between the first and second component when the screws are tightened. The disadvantage of this assembly method is that the threaded bores provided in the second component must always be aligned with the holes provided in the first component to hold the screws, because otherwise it will not be possible to insert all of the screws into the threaded bores. Another disadvantage is that, once the screws have been inserted, the two components can no longer be adjusted with respect to each other before the screws are tightened.

To avoid this disadvantage, it is often standard practice to provide the components to be attached with holes which are larger than the shaft of the screw; washers, which are held by the screws, are also provided to cover each of these holes. The space between the shaft of the screw and the walls of the hole allow the two components to be adjusted with respect to each other; thus, because the screws can shift position inside the holes, the position of the first component can be adjusted with respect to the second component before the screws are tightened.

The disadvantage of the state of the art is that neither the position of the washer nor the position of the spacer can be changed with respect to the shaft of the screw. When the components are being aligned, therefore, the screws are shifted around to different positions in the holes provided for them in the first component, but at the same time the washer and the spacer are also shifted around with respect to the hole in the first component. As a result, it is possible for the surfaces of the washer and of the spacer designed to contact the first component to be pushed to some extent into the area of the hole, where they no longer make contact with the first component. When the screw is tightened, therefore, it is no longer possible for the forces to be transmitted in an optimum manner.

SUMMARY OF THE INVENTION

According to the invention it is possible during the mutual alignment of the two components to achieve not only a two-dimensional change in the position of the screw shaft with respect to the first component but also a two-dimensional change in the position of the washer and of the spacer with respect to the screw shaft. For this purpose, openings designed as slots for guiding the shaft of the screw are provided in the washer and in the spacer. When the components are being aligned, the washer and the spacer can be rotated in such a way that the washer and the spacer continue to be located in a position which is concentric to the center axis of the opening provided in the first component. When the screw is tightened, therefore, it is ensured that the forces are transmitted in an optimum manner from the washer resting against the head of the screw to the first component and from the first component to the spacer. To prevent the spacer from slipping out of position between the first component and the second component when the spacer and washer are being rotated, the spacer is provided with retaining fingers, which project through the hole in the first component.

It is also advantageous for the fingers to project through openings provided in the washer, because this has the effect of permanently establishing the alignment of the slot in the washer with respect to the slot in the spacer. In addition, when the washer is turned, the spacer is automatically rotated along into the correct position also. This is especially advantageous because the spacer is no longer freely accessible after the first component has been placed in position on the second component. It is advantageous for the ends of the fingers, which project beyond the washer, to be provided with manipulation surfaces for rotating the spacer.

The invention therefore provides a reliable, low-cost, easily handled fastening, which satisfies all functional requirements.

Designing the fingers as elastic parts with detents at the ends results in the fingers spreading apart and locking themselves in place behind the openings after the ends of the fingers have passed through the holes provided in the washer. The fingers are thus prevented from sliding out of the openings in the washer when the washer is rotated. In addition, a significant installation advantage is obtained, because the spacer and the washer can be easily preassembled with the first component even without screws. Then the first component, together with the spacer and the washer, can be set directly onto the second component, which greatly facilitates the handling of the device during the fastening operation.

The position of the washer, which is attached to the spacer by the fingers, are fixed with respect to the opening in the first component to the extent that the spacer can only rotate around an axis. This means that, during installation, the spacer and the washer are always kept automatically in a concentric position with respect to the opening in the first component.

DESCRIPTION OF THE EXEMPLARY EMBODIMENT

Figure 1:
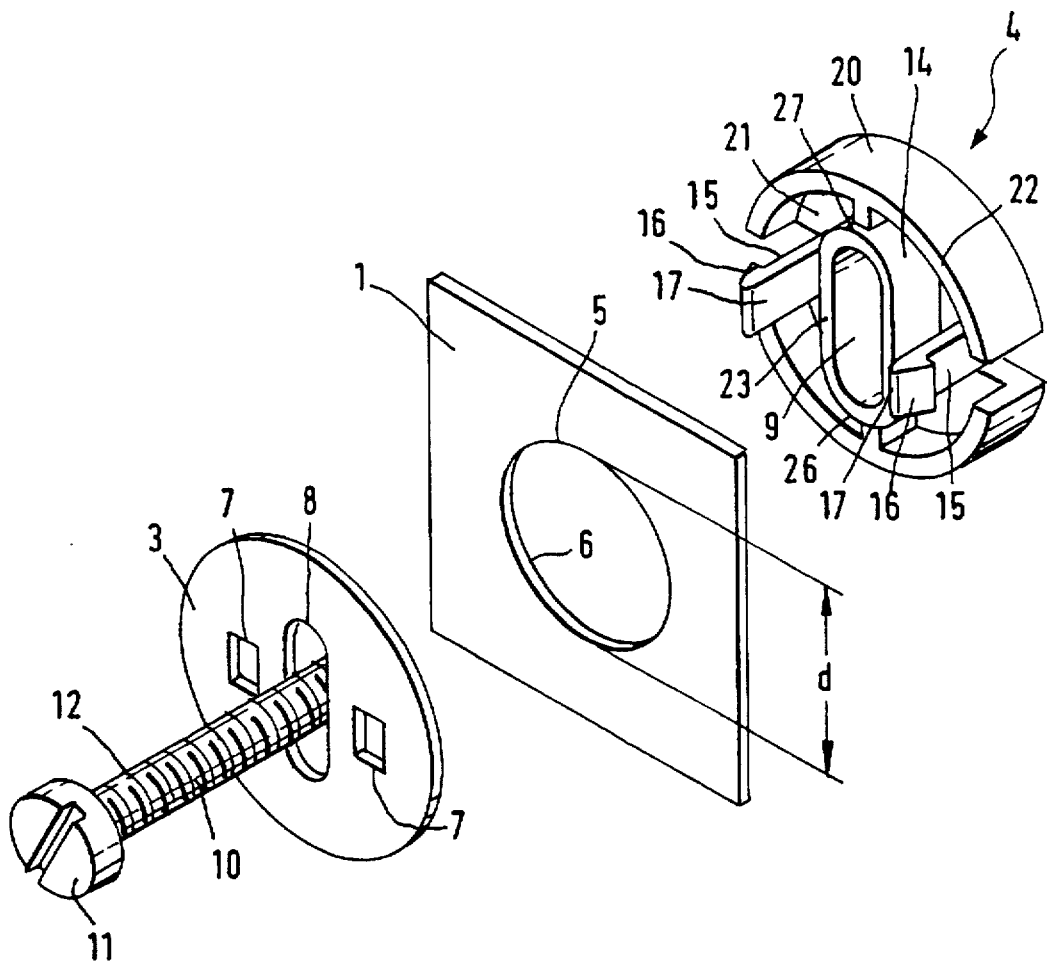
FIG. 1 shows an exploded diagram of the device without the second component.
Figure 2:
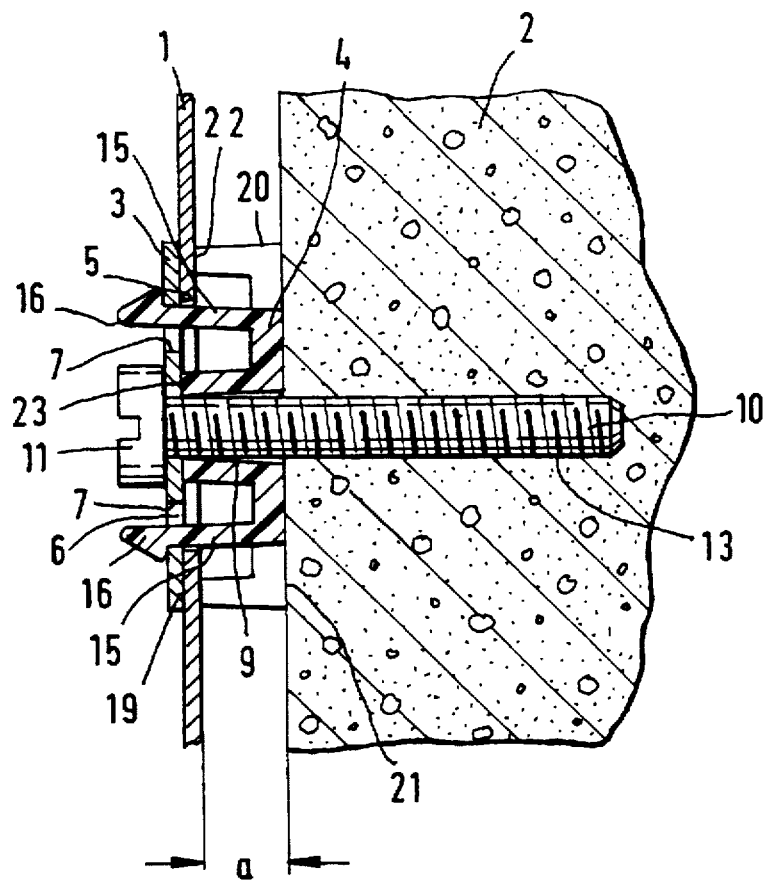
FIG. 2 shows a cross section through the device along a plane which passes through the axis of the screw and the fingers provided in the spacer.

FIG. 1 shows an exemplary embodiment of the invention for fastening two components together and for mutually aligning them. A first component 1, which can be, for example, the sheet metal floor of a housing, is to be fastened by screws 12 to a second component 2 (FIG. 2). Second component 2 can be, for example, another housing box, a board, or a wall. As FIG. 2 shows, second component 2 is provided for this purpose with threaded bores 13 to accept the shafts of screws 10. FIGS. 1 and 2 show only one fastening device accepting only one screw. It is self-evident, however, that component 1 can also be attached to the second component by means of several such fastening devices in the form of, for example, a three-point bracket.

As shown in FIG. 1, first component 1 has an opening 5, which is preferably designed as a drilled hole, the diameter d of which is considerably larger than the diameter of screw shaft 10. Hole 5 in first component 1 allows screw shaft 10 to pass through and allows first component 1 to be aligned with respect to screw shaft 10, which can be freely shifted around inside the hole in two dimensions in the direction of inside wall 6 forming the boundary of hole 5.

As also shown in FIG. 1, a roughly cup-shaped spacer 4 consists of a circular bottom 21 with two side walls 20, designed in the form of cylindrical half-shells, the inside radius of which is greater than the radius of opening 5. The spacer can be made of plastic or metal. Side walls 20, however, can also be designed as a single piece in the form of a continuous cylindrical wall. It is not absolutely necessary, furthermore, for the structure to be circular. It is also possible for the walls to have a rectangular, triangular, or star-shaped outline. End surfaces 22 of side walls 20 serve as contact surfaces for component 1. In the middle of floor 21 of spacer 4 there is an opening 9, designed as a slot. Opening 9 is surrounded by a wall 14, projecting perpendicularly from the floor, a certain distance away from the side walls; end surface 23 of this wall serves as a contact surface for washer 3. It is possible for wall 14 and walls 20 to be the same height. In the exemplary embodiment shown here, wall 14 is slightly higher than walls 20. When first component 1 is laid onto spacer 4, therefore, first component 1 rests on end surfaces 22 of walls 20, whereas at the same time wall 14 projects partially into opening 5 toward the side of first component 1 facing away from spacer 4. The ends 26 and 27 of wall 14 fix the position of spacer 4 with respect to opening 5, but permit spacer 4 to rotate around an axis extending through the center of opening 5. End surface 23 of wall 14 does not project all the way through opening 5; rather, it is recessed with respect to the side of first component 1 facing away from spacer 4. Spacer 4 also has two retaining fingers 15 extending approximately parallel to walls 20 and 14, ends 17 of these fingers having detents 16, the distance between which is greater than the diameter of opening 5. Fingers 15 consist of resilient material, which is preferably the same as the material of the spacer. In the exemplary embodiment shown, fingers 15 are molded in one piece with spacer 4. When first component 1 is set onto spacer 4, detents 16 are pressed inward toward opening 9, then spring back behind opening 5 as a result of the elastic tensioning force of fingers 15. As shown in FIG. 2, fingers 15 are now located diametrically opposite each other at inside wall 6 of opening 5, from which they are separated by a small clearance, so that fingers 15 are not actually resting completely against inside wall 6. The position of spacer 4 is now fixed with respect to first component 1 not only by ends 26, 27 of wall 14 but also by fingers 15, which can still rotate in opening 5. It is advantageous for distal ends 17 of fingers 15 to be provided with manipulation surfaces for rotating spacer 4. The spacer, shown here as a single piece, can also be designed as a multi-part component, in which fingers 15 are connected by an integral web.

A washer 3, which has an opening 8 designed as a slot for accepting screw 12, is placed over hole 5. Washer 3 is a disk with a diameter which is larger than diameter d of opening 5, so that an annular area 19 of washer 3 rests on first component 1, and the edges of opening 8 in washer 3 are spaced a short distance (not shown in FIG. 2) from end surface 23 of wall 14 of spacer 4. Ends 17 of the two fingers 15 of spacer 4 are guided through openings 7 in washer 3, and detents 16 lock behind openings 7. The position of openings 7 is selected so that slot 8 in washer 3 lines up longitudinally with slot 9 in spacer 4. The spacer and the washer are now premounted on first component 1. This provides a significant installation advantage with respect to the attachment of the two components, because the amount of handling to which the multi-component device must be subjected is greatly reduced.

Finally, screw 12 is passed through slot 8, hole 5, and opening 9 and screwed into threaded bore 13 in second component 2. When screw 12 is tightened, annular area 19 of washer 3 is pressed against first component 1, which in turn is pressed against end surfaces 22 of spacer 4, and the spacer is pressed against second component 2. The large load-carrying area of end surfaces 22 of walls 20 allows the force to be transmitted effectively. Because end surface 23 of wall 14 is recessed with respect to the side of the first component facing away from spacer 4, it is ensured that washer 3 is pressed against component 1. Only as screw 12 is tightened further is washer 3 deformed slightly in the area of opening 8 and finally pressed against end surface 23 of walls 14 of spacer 4. Component 1 is held by the spacer a certain distance a away from second component 2. So that the two components can be aligned with each other, either screw 12 is not yet completely tightened or is loosened slightly, so that it is possible for first component 1 together with washer 3 and spacer 4 connected to it to be shifted around with respect to screw shaft 10 and component 2. The position of spacer 4 and of washer 3 connected to it by fingers 15 can be changed with respect to first component 1 only by rotation.

If, when aligning the components, it is necessary for first component 1 to be shifted sideways in a certain direction with respect to second component 2, the long axis of slot 8 of washer 3 is first rotated into alignment with this direction; the longitudinal axis of slot 9 of spacer 4 is rotated into the same alignment simultaneously by way of fingers 15. First component 1 can then be shifted in this direction, and shaft 10 of screw 12 shifts in the direction of the longitudinal axis of slots 8, 9. Once component 1 is in the desired position with respect to component 2, screw 12 is tightened again.

As an alternative to the exemplary embodiment shown here, it is also possible, if second component 2 is, for example, a sheet metal plate, to provide second component 2 with simple drilled holes instead of the threaded bores 13 provided in second component 2. Screws 12 would then be passed first through these holes, so that the heads of the screws rest against the rear surface of second component 2 facing away from first component 1. When first component 1 is placed in position together with spacer 3 and washer 3, the screw shank will pass through openings 9, 5, and 8, and the end of the shank facing away from the head of the screw will project beyond washer 3. A nut can be now be placed on this end; this nut now serves as the tensioning element. It is also conceivable that threaded pins and nuts or other screwable fastenings could be used in place of screws 12.

What is claimed is:

1. Device for fastening together first and second components in spaced relationship, the first component having an opening, said device comprising:

a spacer configured to be received between said first and second components, said spacer having a slot flanked by a pair of fingers configured so as to be extendable through said opening in said first component, a washer having a slot flanked by a pair of holes spaced to receive said fingers therethrough when said slot in said washer is aligned with said slot in said spacer, said washer having an outside diameter which is configured to be larger than the opening in the first component as said fingers are extended through said opening in said first component and received in said holes in said washer, and a screw member received in through said slot in said washer, and said slot in said spacer, said slots both being elongated, and said fingers and holes being positioned so that when said fingers are in said holes, the slots in the washer and spacer are both elongated in the same direction transverse to said screw member, said screw member being moveable in said elongated slots in the transverse direction to provide adjusting relative movement of said first and second components during fastening of said first component in spaced relationship with said second component.

2. Device as in claim 1 wherein said fingers are resilient fingers which can be flexed toward each other, said fingers having distal ends provided with detents for engaging said washer and for holding said spacer, said first component, and said washer together as an assembly when assembled therewith.

3. Device as in claim 1 wherein said spacer comprises an outer wall for being received against said first component outside of said opening, and an inner wall defining the slot in said spacer, said inner wall having ends which are configured so as to be closely received through said opening in said first component, whereby movement of said spacer relative to said first component is limited to rotation about an axis through the center of the opening.

4. An assembly comprising:

first and second components to be fastened together in a spaced relationship;

the first component having an opening therein;

a spacer supported between said first and second components, said spacer having an elongated slot therein and a pair of fingers each on a respective side of said slot and extending through said opening in said first component, a washer positioned such that the first component is between said washer and said spacer, said washer having an outside diameter which is larger than the opening in the first component so that said washer cannot pass therethrough, said washer having a second elongate slot and a pair of holes therein, said holes each receiving therein a respective one of said fingers, said slot in said washer being aligned with said slot in said spacer so that said slots are elongated in one common direction; and a screw member extending through said slot in said washer, said opening in said first component, and said slot in said spacer, and engaging securingly with said second component and holding said washer, said first component, said spacer and said second component together;

said screw member and said elongated slots being configured so as to provide adjusting movement transverse to the screw member and in the common direction of elongation of the slots of said washer, said first component, and said spacer relative to said second component during fastening of said first component in spaced relationship with said second component.

5. The assembly of claim 4 wherein said fingers are resilient fingers which can be flexed toward each other, said fingers having distal ends provided with detents that retainingly engage said washer and hold said spacer, said first component, and said washer together.

6. The assembly of claim 4 wherein the first component has an edge portion defining the opening to be circular and wherein said spacer has an outer wall engaging said first component outside of said opening, and an inner wall defining the slot in said spacer, said inner wall having ends which engage the edge portion closely enough so that movement of said spacer relative to said first component is limited to rotation about an axis through the center of the opening.

7. The assembly of claim 6 wherein the fingers are positioned on said spacer so that only if the slots of said spacer and said washer are elongate in the same direction can the fingers be inserted into said holes in said washer.

* * * * *